United States Patent Office 3,330,812
Patented July 11, 1967

3,330,812
VINYL POLYMERS CONTAINING PERFLUOROCARBON GROUPS AND ACYL HALIDE GROUPS
Samuel Smith, Roseville, and Patsy O. Sherman, Bloomington, Minn., assignors to Minnesota Mining and Manufacturing Company, St. Paul, Minn., a corporation of Delaware
No Drawing. Filed Apr. 27, 1964, Ser. No. 362,946
17 Claims. (Cl. 260—79.3)

The present invention relates to novel and useful fluorine containing copolymers. In one aspect the invention relates to fluorocarbon group-containing surface treating agents. In another aspect it relates to treated substrates which are durably oil and water repellent.

Various fluorocarbon group-containing polymers suitable for treating surfaces to render them oil and water repellent are known, thus see United States Patents Nos. 2,803,615, 3,068,187 and 3,102,103. The resulting fluorocarbon surface treatments, although very effective, have often been adversely affected by repeated cleanings. It is therefore much to be desired to improve the durability of such treatments, particularly in articles which are repeatedly laundered or dry-cleaned in normal use such as clothing and other fabric and leather articles. In the present invention certain reactive groups in the polymer are utilized to obtain improved durability to cleaning.

An object of this invention is to provide certain novel fluorocarbon group-containing polymers.

Another object of this invention is to provide novel oil and water repellent treatments for substrates.

Another object of this invention is to provide new and useful oil and water repellent treating agents.

Still another object of this invention is to provide oil and water repellent treatments of improved durability to laundering and dry-cleaning.

Still another object of this invention is to provide fluorocarbon copolymers which contain recurring reactive groups.

Another object of this invention is to provide durably oil and water repellent articles.

Still another object of this invent ion is to provide durably oil and water repellent fibers.

Yet another object of the invention is to provide durably oil and water repellent textile fabrics.

Various other objects and advantages will become apparent to those skilled in the art from the accompanying description and disclosure.

The polymers of the present invention have carbon to carbon main chains or back-bones and contain recurring monovalent perfluorocarbon groups having from four to eighteen carbon atoms and recurring acyl halide radicals. The polymers contain at least 20 percent by weight of fluorine which is in the perfluorocarbon groups and at least 0.2 percent by weight acyl halide radicals. Preferably they contain from 20 to 70 percent fluorine and from 0.2 to 20 percent of acyl halide radicals, these ranges being given on a weight basis. They comprise a minimum of two different recurring units: one containing the fluorocarbon group and one containing the acyl halide radical. They are prepared by the addition copolymerization of at least two different ethylenically unsaturated monomers through their ethylenically unsaturated groups, one monomer containing the fluorocarbon group and the other containing the acyl halide radical. Each recurring unit of the polymer is thus the result of the addition polymerization of a monomer.

Certain of the polymers of the invention contain more than two kinds of recurring groups, e.g. a plurality of different fluorocarbon containing units, a plurality of different acyl halide-containing units and/or one or more recurring units which contain neither fluorocarbon nor acyl halide. Further the different types of units can appear randomly or in some particular arrangement. Thus, block and graft copolymers (i.e. segmented copolymers) are included as are homogeneous polymers (in which the component monomeric units appear in more or less random fashion therein). Segmented copolymers are discussed at some length in U.S. Patent 3,068,187.

The fluorocarbon groups of the polymers are saturated and contain from 4 to 18 fully fluorinated carbon atoms. It is of critical importance that the fluorocarbon groups contain at least 4 carbon atoms to provide oil and water repellent properties and the preferred number is 6–10. Highly satisfactory properties of oil and water repellence and relative economy of production are combined in products in which the fluorocarbon groups contain 6 to 10 carbon atoms.

The complete fluorocarbon group can be a perfluoroalkyl group having an open (acyclic) straight- or branched-chain, or a cyclic structure (e.g. a perfluorocyclohexyl group having a 6-membered ring structure) or it can consist of a combination of perfluoroalkyl straight chain and perfluorocyclic groups. The perfluorocarbon group may be bonded to a sulfur-atom of the molecule through either a cyclic or acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure, as is shown, for instance, in U.S. Patent Nos. 2,500,388 and 2,616,927.

The halogen atoms (X) of the acyl halide radicals (—COX) in the polymers have atomic weights of less than 80. The preferred acyl halides are acyl chlorides, suitable monomers containing acyl chlorides being most satisfactory and easily available.

The copolymers of the invention are useful for imparting highly durable repellence to oil and water and resistance to soiling to a variety of substrates. Fibrous and porous surfaces may be treated with these polymers to achieve these results. Illustrative articles to be treated are textiles, paper, wood, leather, fur, and asbestos. Among the articles which are advantageously treated are apparel, upholstery, draperies, carpeting, bags, containers, luggage, hand bags, shoes and jackets.

When the substrate treated is a fabric, 0.05 to 5 percent (preferably 0.1 to 1 percent) by weight of copolymer based on the weight of the fabric produces desirable surface properties. Illustrative textiles which can be advantageously treated with the copolymers of this invention are those based on natural fibers, e.g. cotton, wool, mohair, linen, jute, silk, ramie, sisal, kenaf, etc. and those based on synthetic fibers, e.g. rayon, acetate, acrylic, polyester, saran, azylon, nytril, nylon, spandex, vinyl, olefin, vinyon and glass fibers. (The above designations of synthetic fibers are the proposed generic terms set up by the Federal Trade Commission.) The treatment of these fabrics with the compositions of this invention imparts no adverse effect on the hand of the fabric and in some cases has a softening effect, thereby improving the hand.

It is not known with certainty why the polymers of the present invention which contain acyl halide groups exhibit superior properties of durability when compared to similar polymers containing no acyl halide groups. It is believed, however, that the acyl halide groups react with the substrates coated, possibly by condensation with active hydrogen atoms to provide treatment which is chemically bonded to the substrates. It has been found, in fact, that in the application of these polymers to substrates containing active hydrogen atoms (e.g. cotton) hydrogen halide is evolved and it is desirable in such cases to employ a suitable acid acceptor, such as a tertiary amine. The latter may be used to pretreat the substrate to be treated or, more preferably, be employed as an additive to the polymer treating bath. The present invention, however, is in no way limited by the mechanism of its operation.

The polymers of the invention are applied as surface treatments by known methods of coating such as spraying, brushing or impregnation from solution or dispersions thereof in organic solvents which are not spontaneously reactive with the acyl halide radicals. The polymers may be used as the sole component in the treating vehicle or as a component in a complex multi-ingredient formulation. The substrate can be treated with one or more conventional finishes (such as mildew preventives, moth resisting agents, modified crease resistant resins, lubricants, softeners, sizes, flame retardants, antistatic agent, dye fixatives, and water repellents) and then with the copolymer or alternatively with a conventional finish or finishes and the copolymer simultaneously. In the treatment of paper the polymer may be present as an ingredient in a wax, elastomer or wet strength resin formulation. The finishes applied with the polymers of the invention are, however, chosen so that they do not react rapidly with acyl halide. Thus, compounds containing free primary or secondary amine groups are not ordinarily added to a treating bath containing a polymer of the invention.

The general structural formula of the fluorocarbon containing monomers employed in this invention (and from which the fluorocarbon group containing units of the polymers are formed) is $R_fP$ where $R_f$ is a fluorocarbon group as previously defined and P is a radical containing a group which is polymerizable by free radical mechanisms. Illustrative types of these fluorine-containing monomers are the acrylate, methacrylate and α-chloroacrylate esters (acrylate-type esters), of N-alkanol perfluoroalkane sulfonamides such as N-butyl perfluorooctanesulfonamidoethyl acrylate, N-ethyl perfluorooctanesulfonamidoethyl methacrylate, N-methyl perfluorobutanesulfonamidobutyl acrylate and N-ethyl perfluorooctanesulfonamidoethyl α-chloroacrylate; of omega-perfluoroalkyl alkanols such as 1,1-dihydroperfluorohexyl acrylate, 1,1-dihydroperfluorodecyl methacrylate, 1,1-dihydroperfluorooctyl α-chloroacrylate, 3-(perfluorooctyl)-propyl acrylate, 2-(perfluoroheptyl)-butyl methacrylate, 11-(perfluorooctyl)-undecyl acrylate and 3-(perfluoroheptyl)-propyl α-chloroacrylate; and of 1,1,3-trihydroperfluoroalkanols such as 1,1,3-trihydroperfluorooctyl acrylate. Other types of monomers which are employed in preparing the polymers of the invention are 1,1-dihydroprfluoroalkyl acrylamides such as 1,1,-dihydroperfluorooctyl acrylamide; 1,1-dihydroperfluoroalkyl vinyl ethers such as 1,1-dihydroperfluorohexyl vinyl ethers; vinyl perfluoroalkyl ketones such as vinyl perfluorooctylketone; and allyl perfluoroalkyl ketones such as alkyl perfluorooctylketone.

Among the acyl halide radical-containing monomers suitable for use in the copolymer of the present invention (from which the acyl halide radical containing units of the polymers are formed) are acrylyl chloride, acrylyl fluoride, acrylyl bromide, methacrylyl chloride, maleyl chloride, maleyl fluoride, maleyl bromide, cinnamyl chloride, buten-(3-oyl chloride, fumaryl chloride, itaconyl chloride, sorbyl chloride, citroconyl chloride, and p-vinyl benzoyl chloride. As exemplified above, the halide group in these monomers can be bromide or fluoride as well as chloride. They can be mono- or polyunsaturated and the ethylenically unsaturated groups can be located in either terminal or internal positions in the compounds.

As noted previously, the copolymers can also contain recurring units which contain neither fluorocarbon groups or acyl halide racials. They are formed from ethylenically unsaturated monomers of corresponding structures. These monomers are free of groups which co-react with acyl halide and include ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, halogenated styrenes, alkyl and epoxyalkyl esters of acrylic acid, methacrylic acid and α-chloroacrylic acid, methacrylonitrile, vinylcarbozole, vinyl pyrrolidone, vinyl pyridine, vinyl alkyl ethers, vinylalkyl ketones, butadiene, chloroprene, fluoroprene and isoprene.

The copolymers of this invention are generally prepared using bulk or solution polymerization techniques. Among the solvents which can be used as media in the solution polymerizations and as application solvents are trichlorofluoromethane, 1,1,2-trichloro-1,2,2-trifluoroethane, benzene, benzotrifluoride, xylene hexafluoride, 1,1,1-trichloroethane and butyl acetate. Such solvents are free of groups capable of reacting with acyl halide radicals. In general the halogenated solvents are preferred.

In the treatment of fabrics, the copolymers of this invention may be applied prior to, subsequent to or in admixture with other treating agents, such as modified crease resisting resins, sizes, softeners, and water repellents.

The following examples are offered to furnish a better understanding of the present invention and are not to be construed as in any way limiting thereof. While the surface treatment portions of the examples relate to fabrics, it should be understood that other materials of the previously defined types can be treated in essentially analogous manners.

The fluorinated monomers employed in the examples are:

(I)    $C_8F_{17}SO_2N(C_3H_7)C_2H_4OCOCH{=}CH_2$
(II)   $C_8F_{17}SO_2N(CH_3)C_{11}H_{22}OCOCH{=}CH_2$
(III)  $C_7F_{15}CH_2OCOC(CH_3){=}CH_2$
(IV)   $C_7F_{15}C_3H_6OCOC(CH_3){=}CH_2$
(V)    $C_8F_{17}SO_2N(CH_3)C_{11}H_{22}OCOC(CH_3){=}CH_2$

Methods of preparing the monomers are disclosed in U.S. Patents 2,642,416, 2,803,615 and 3,102,103.

The procedure employed to prepare the polymers in the examples involves the following sequence of steps:

(a) Charging the reactants to a heavy-walled Pyrex glass ampoule.
(b) Removing oxygen by freezing the ampoule and its contents in liquid air, and evacuating the ampoule to a pressure of less than 0.01 mm. mercury.
(c) Sealing the degassed ampoule.
(d) Warming the sealed ampoule until the contents are melted.
(e) Polymerizing the contents by placing the ampoule in an end-over-end rotator in a water bath at the indicated temperatures.

The fabric treatment procedures and the methods of evaluation of such treatments in the examples are as follows:

The fabrics are treated by immersing them in a pad bath containing the ingredients specified in the concentrations indicated, running the wet fabrics through rubber squeeze rolls at a nip pressure of 30 p.s.i., and thereafter curing them for 5 minutes, at 130° C.

The water repellency of the treated fabrics is measured by Standard Test No. 22–52, published in the 1952 Technical Manual and Yearbook of the American Association of Textile Chemists and Colorists, vol. XXVIII, page 136. The "spray rating" is expressed on a 0 to 100 scale, wherein 100 is the highest possible rating.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture. The oil repellency rating numbers used herein and the compositions of the corresponding test solutions are as follows:

| Oil repellency rating | Percent heptane by volume | Percent mineral oil by volume |
|---|---|---|
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | ---------- | (1) |

[1] No holdout to mineral oil.

To measure the oil repellency of a treated fabric 3" x 8" swatches thereof are cut and placed flat on a table. A drop of each oil mixture is gently placed on the surface of the fabric. The number corresponding to that mixture containing the highest percentage heptane which does not penetrate or wet the fabric after three minutes contact is considered the oil repellency rating of the sample.

The laundering cycle referred to herein is as follows: The treated fabrics are laundered once in a 9 lb. load, agitating, automatic washing machine using water at 140° F. and a commercial detergent and then tumble-dried in an automatic drier for 20 minutes at 190° C. before being tested. They are not ironed after drying.

The dry cleaning cycle referred to herein is as follows: The treated fabrics are dry cleaned once in a commercial dry cleaning establishment using perchloroethylene containing a potassium oleate soap as the vehicle. They are not pressed after cleaning.

EXAMPLE 1

A glass ampoule is charged with 4.4 grams (50 mol percent) monomer, I, 0.6 gram (50 mol percent) acrylyl chloride, 5.0 grams xylene hexafluoride and 0.05 gram benzoyl peroxide and sealed. The polymerization is carried out in a 60° C. water bath for 90 hours. At the end of this time the contents of the ampoule are coagulated and washed in heptane, and dried in a vacuum oven. A yield of 3.65 grams of polymer (73% of the theoretical yield) containing 45 mol percent acrylyl chloride is obtained. This corresponds to a copolymer containing 45.4 weight percent fluorine and 7.23 weight percent acyl chloride. A homopolymer of monomer I is prepared in the same manner.

The homopolymer and acrylyl chloride copolymer are dissolved in sufficient 95:5 xylene hexafluoride:2,4-lutidine solvent to form 2% solutions. Cotton and wool fabrics previously dried 5 days at 110° C. are padded with these solutions and cured for 10 minutes at 140° C. After measurement of initial properties the samples are extracted with xylene hexafluoride for 5½ hours in soxhlet flasks and air dried. The comparative test results of oil repellency and spray rating of the two polymers before and after extraction are set out in Table I.

A copolymer of 98.5 weight percent of monomer I and 1.5 weight percent acrylyl chloride (90:10 mole ratio) is prepared using the same process as in the foregoing copolymer lot. The resulting copolymer container 49.8 weight percent fluorine and 1.08 weight percent acyl chloride. The benefits of the invention as compared to the homopolymer of monomer I are apparent from tests run on fabric samples treated with this copolymer.

EXAMPLE 2

Two copolymers and one homopolymer of monomer II are prepared as follows:

A. *Copolymer of monomer II and acrylyl chloride*

A glass ampoule is charged with 3.6 grams of monomer II, 0.4 gram methacrylyl chloride, 7.2 grams 1,1,1-trichloethane and 0.04 gram benzoyl peroxide and sealed. After 40 hours of reaction at 75° C., an 82% yield of polymer containing 9.6 weight percent acrylyl chloride is obtained. This corresponds to a copolymer containing 39.6 weight percent fluorine and 5.7 weight percent acyl chloride.

B. *Copolymer of monomer II and methacrylyl chloride*

A glass ampoule is charged with 3.6 grams of monomer 11, 0.4 gram methacrylyl chloride, 7.2 grams 1,1,1-trichloroethane and 0.04 gram benzoyl peroxide and sealed. After 40 hours reaction at 75° C., a 90% yield of polymer containing 10.0 weight percent methacrylyl chloride is obtained. This corresponds to a copolymer containing 39.5 weight percent fluorine and 5.2 weight percent acyl chloride.

C. *Homopolymer of monomer II*

A glass ampoule is charged with 3.0 grams of monomer II, 5.4 grams 1,1,1-trichloroethane and 0.015 gram benzoyl peroxide and sealed. After 26 hours of reaction at 75° C., a 93% yield of polymer is obtained.

These three polymers are used to treat the various natural and synthetic fabrics listed in Table II. The copolymer solutions are diluted to 1% solids with a 95:5 mixture of 1,1,1-trichloroethane and dimethyl aniline for treating and the homopolymer is diluted to 1% solids with a 5:1 mixture of 1,1,1-trichloroethane and benzotrifluoride. After padding with these solutions the fabrics are cured 5 minutes at 130° C. The copolymer treated fabrics are rinsed in 1,1,1-trichloroethane to remove excess dimethylaniline and recured for 5 minutes at 130° C. Oil and spray ratings are measured initially, after laundering and tumble-drying, after extraction with xylene hexafluoride (for 24 hours in a soxhlet flask followed by a 5 minute dry at 130° F.). Results shown in Table II demonstrate the relative initial performance, and the durability achieved with these three treatments.

TABLE I

| Polymer | Cotton | | | | Wool | | | |
|---|---|---|---|---|---|---|---|---|
| | Initial | | After Extraction | | Initial | | After Extraction | |
| | Oil | Spray | Oil | Spray | Oil | Spray | Oil | Spray |
| Acrylyl chlorode copolymer | 90 | 90 | 100 | 100 | 90 | 70 | 90 | 100 |
| Homopolymer | 80 | 90 | 80 | 80 | 80 | 90 | 70 | 50 |

TABLE II

| Polymer | Fabric | Initial | | Laundered | | Extracted | |
|---|---|---|---|---|---|---|---|
| | | Oil | Spray | Oil | Spray | Oil | Spray |
| A. Monomer II: acrylyl chloride copolymer. | Cotton | 110 | 100 | 100 | 80 | 110 | 100 |
| | Polyester | 130 | 100 | 100 | 90 | 110 | 100 |
| | Acrylic | 140 | 100 | 80 | 80 | 100 | 100 |
| | Nylon | 130 | 100 | 100 | 80 | 70 | 80 |
| | Rayon | 140 | 100 | 110 | 70 | 110 | 100 |
| | Wool | 140 | 100 | -------- | -------- | 70 | 90 |
| B. Monomer II: methacrylyl chloride copolymer. | Cotton | 130 | 100 | 110 | 80 | 110 | 100 |
| | Polyester | 130 | 100 | 90 | 100 | 110 | 100 |
| | Acrylic | 140 | 100 | 100 | 90 | 110 | 100 |
| | Nylon | 140 | 100 | 110 | 100 | 100 | 100 |
| | Rayon | 140 | 100 | 120 | 70 | 130 | 100 |
| | Wool | 140 | 100 | -------- | -------- | 120 | 100 |
| C. Monomer II: homopolymer. | Cotton | 120 | 90 | 60 | 70 | 0 | 50 |
| | Polyester | 120 | 100 | 80 | 100 | 0 | 50 |
| | Acrylic | 140 | 80 | 60 | 70 | 0 | 0 |
| | Nylon | 130 | 100 | 0 | 70 | 0 | 0 |
| | Rayon | 140 | 80 | 60 | 0 | 0 | 0 |
| | Wool | 140 | 100 | -------- | -------- | 0 | 70 |

EXAMPLE 3

Two copolymers and one homopolymer of monomer III are prepared as follows:

A. *Copolymer of monomer III and acrylyl chloride*

A glass ampoule is charged with 3.6 grams of monomer III, 0.4 gram acrylyl chloride, 7.2 grams benzotrifluoride and 0.04 gram benzoyl peroxide and sealed. Polymerization is carried out in a 75° C. water bath for 40 hours. At the end of this time a 68% yield of polymer containing 5.4 weight percent of acrylyl chloride is obtained. This corresponds to a copolymer containing 58.2 weight percent fluorine and 3.2 weight percent acyl chloride.

fluoride:dimethyl aniline for treating and the homopolymer is diluted to 1% solids with 2:1 benzotrifluoride:trichlorotrifluoroethane. After padding with the resulting solutions, the fabrics are cured 5 minutes at 130° C. The fabrics treated with copolymer are rinsed in benzotrifluoride to remove excess dimethyl aniline and recured for 5 minutes at 130° C. Oil and spray ratings are measured initially, after laundering and tumble drying, after commercial dry cleaning and after extraction with xylene hexafluoride (for 24 hours in a soxhlet flask followed by drying for 5 minutes at 130° C.). The results of these tests are given in Table III. They illustrate the superior durability to laundering, dry cleaning and extraction of the copolymers as compared to the homopolymer.

TABLE III

| Polymer | Fabric | Initial | | Laundered | | Dry Cleaned | | Extracted | |
|---|---|---|---|---|---|---|---|---|---|
| | | Oil | Spray | Oil | Spray | Oil | Spray | Oil | Spray |
| A. Monomer III: acrylyl Chloride copolymer. | Cotton | 110 | 100 | 90 | 80 | 80 | 70 | 100 | 100 |
| | Dacron | 110 | 100 | 90 | 90 | 100 | 80 | 100 | 100 |
| | Acrilan | 110 | 100 | 60 | 80 | 90 | 50 | 70 | 100 |
| | Nylon | 110 | 100 | 60 | 70 | 70 | 50 | 80 | 100 |
| | Viscose | 110 | 100 | 100 | 70 | 100 | 50 | 110 | 100 |
| | Wool | 130 | 100 | -------- | -------- | 80 | 80 | 100 | 100 |
| B. Monomer III: methacrylyl chloride copolymer. | Cotton | 100 | 100 | 80 | 80 | 90 | 90 | 90 | 100 |
| | Dacron | 100 | 100 | 80 | 90 | 100 | 80 | 80 | 100 |
| | Acrilan | 110 | 100 | 70 | 90 | 100 | 80 | 90 | 100 |
| | Nylon | 100 | 100 | 60 | 70 | 90 | 80 | 80 | 100 |
| | Viscose | 110 | 100 | 80 | 50 | 100 | 70 | 90 | 90 |
| | Wool | 120 | 100 | -------- | -------- | 80 | 80 | 50 | 90 |
| C. Monomer III: homopolymer. | Cotton | 100 | 100 | 0 | 0 | 80 | 80 | 0 | 0 |
| | Dacron | 110 | 100 | 80 | 90 | 50 | 70 | 0 | 0 |
| | Acrilan | 100 | 100 | 0 | 0 | 0 | 0 | 0 | 0 |
| | Nylon | 100 | 100 | 0 | 0 | 0 | 0 | 0 | 0 |
| | Viscose | 130 | 80 | 0 | 0 | 0 | 0 | 0 | 0 |
| | Wool | 100 | 100 | -------- | -------- | 0 | 60 | 0 | 70 |

B. *Copolymer of monomer III and methacrylyl chloride*

A glass ampoule is charged with 3.6 grams of monomer III, 0.4 gram methacrylyl chloride, 7.2 grams benzotrifluoride and 0.04 gram benzoyl peroxide and sealed. Polymerization is carried out in a 75° C. water bath for 40 hours. At the end of this time an 81% yield of polymer containing 10.2 weight percent methacrylyl chloride is obtained. This corresponds to a copolymer containing 54.6 weight percent fluorine and 5.4 weight percent acyl chloride.

C. *Homopolymer of monomer III*

A glass ampoule is charged with 3.0 grams of monomer III, 12.0 grams 1,1,2-trichloro-1,2,2-trifluoroethane (hereafter called simply trichlorotrifluoroethane) and 0.03 gram benzoyl peroxide and sealed.

After reaction in a 75° C. water bath for 20 hours an 89% yield of polymer is obtained.

These three polymers are used to treat the various natural and synthetic fabrics listed in Table III. The copolymers are diluted to 1% solids with 95:5 benzotri-

EXAMPLE 4

A copolymer and a homopolymer of monomer IV are prepared as follows:

A. *Copolymer of monomer IV and methacrylyl chloride*

A glass ampoule is charged with 3.6 grams of monomer IV, 0.4 gram methacrylyl chloride, 7.2 grams benzotrifluoride and 0.04 gram benzoyl peroxide and sealed. After 26 hours reaction at 75° C. a 75% yield of polymer containing 11.6 weight percent methacrylyl chloride is obtained. This corresponds to a copolymer containing 50.7 weight percent fluorine and 6.1 weight percent acyl chloride.

B. *Homopolymer of monomer IV*

A glass ampoule is charged with 3.0 grams of monomer IV, 12.0 grams trichlorotrifluoroethane and 0.03 gram benzoyl peroxide and sealed. After 26 hours reaction at 75° C. an 83% yield of polymer is obtained.

These two polymers are used to treat fabrics made from the natural and synthetic fibers listed in Table IV. The copolymer solution is diluted to 1% solids with 95:5 benzotrifluoride:dimethyl aniline for treating and the homopolymer is diluted to 1% solids with 2:1 benzotrifluoride:trichlorotrifluoro ethane. After padding with the resulting solutions the fabrics are cured 5 minutes at 130° C. The copolymer treated fabrics are rinsed in benzotrifluoride to remove excess dimethyl aniline and recured 5 minutes at 130° C. Oil and spray ratings are measured initially, after laundering and tumble-drying, after commercial dry cleaning and after extraction with xylene hexafluoride (for 24 hours in a soxhlet flask followed by a 5 minute dry at 130° C.). The results of these tests are shown in Table IV.

TABLE IV

| Polymer | Fabric | Initial | | Laundered | | Dry Cleaned | | Extracted | |
|---|---|---|---|---|---|---|---|---|---|
| | | Oil | Spray | Oil | Spray | Oil | Spray | Oil | Spray |
| A. Monomer IV: methacrylyl chloride copolymer | Cotton | 100 | 100 | 80 | 80 | 100 | 80 | 100 | 100 |
| | Dacron | 100 | 100 | 80 | 90 | 100 | 80 | 70 | 100 |
| | Acrilan | 110 | 100 | 90 | 90 | 110 | 80 | 100 | 100 |
| | Nylon | 100 | 100 | 80 | 80 | 100 | 80 | 80 | 100 |
| | Viscose | 110 | 100 | 100 | 70 | 110 | 80 | 100 | 90 |
| B. Monomer IV: homopolymer. | Cotton | 110 | 100 | 50 | 50 | 120 | 70 | 50 | 70 |
| | Dacron | 110 | 100 | 60 | 80 | 50 | 80 | 0 | 0 |
| | Acrilan | 120 | 90 | 0 | 0 | 70 | 80 | 0 | 0 |
| | Nylon | 110 | 100 | 0 | 50 | 90 | 70 | 0 | 0 |
| | Viscose | 120 | 80 | 0 | 0 | 110 | 50 | 0 | 0 |

EXAMPLE 5

A copolymer of 78.5 weight percent of monomer I, 1.1 weight percent of acrylyl chloride and 20.4 weight percent of 2-ethylhexyl acrylate (mole ratio 50:5:45) is prepared using the process of Example 3. The resulting polymer contains 39.8 weight percent fluorine and 0.77 weight percent acyl chloride. Cotton fabric treated with this copolymer has an initial oil repellence of 100 and an initial spray rating of 90. Wool fabric treated with this copolymer has an initial oil repellency of 110 and an initial spray rating of 100.

EXAMPLE 6

A glass ampoule is charged and sealed as described in Example 3 with 2.8 grams of monomer V, 0.8 gram of octadecyl methacrylate, 0.4 gram of methacrylyl chloride, 7.2 grams of 1,1,1-trichloroethane and 0.04 gram of benzoylperoxide. After 40 hours of reaction at 75° C. at 85 percent yield of polymer containing 2.9 percent of chlorine (5.2 weight percent of acyl chloride) is obtained.

This polymer is used to treat textiles as in the preceding examples. Cotton fabric treated with the polymer has an initial oil repellency of 110, an initial spray rating of 100 and an oil repellency of 90 and a spray rating of 70 after dry cleaning. Wool fabric treated with the polymer has an oil repellency of 120 and a spray rating of 100 initially and an oil repellency of 100 and a spray rating of 80 after dry cleaning.

Various combinations of fluorocarbon group- and acyl halide radical-containing monomers may be employed in the preparation of the polymers of the invention. More than one monomer of either of these types may be included in the polymer as may other monomers which include neither such group. Variations of the techniques of polymerization and of applying the polymers to the substrates will be apparent to those skilled in the art from reading the accompanying description and disclosure.

What is claimed is:

1. A copolymer of an ethylenically unsaturated fluorocarbon monomer and an ethylenically unsaturated acyl halide radical-containing monomer which is suitable for use as an oil- and water-repellent coating on a fibrous or porous surface, the copolymer having a carbon to carbon main chain and containing recurring monovalent perfluorocarbon groups containing from 4 to 18 carbon atoms and recurring acyl halide radicals, at least 20 percent of the weight of the polymer being contributed by fluorine atom in the perfluorocarbon groups and at least 0.2 percent of the weight of the polymer being contributed by acyl halide radicals, the halogen atoms of the acyl halide radicals having atomic weights of less than 80, said copolymer having improved surface adherability properties as compared to the homopolymer of the corresponding fluorocarbon monomer.

2. A polymer according to claim 1 which contains recurring monovalent unit groups derived from an acrylate-type ester of an N-alkanol perfluoroalkanesulfonamide.

3. A polymer according to claim 1 which contains recurring monovalent unit groups derived from an acrylate-type ester of an omega-perfluoroalkyl alkanol.

4. A polymer according to claim 2 wherein the ester has the formula:

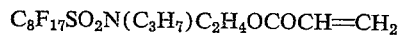
$$C_8F_{17}SO_2N(C_3H_7)C_2H_4OCOCH=CH_2$$

5. A polymer according to claim 2 wherein the ester has the formula:

$$C_8F_{17}SO_2N(CH_3)C_{11}H_{22}OCOCH=CH_2$$

6. A polymer according to claim 2 wherein the ester has the formula:

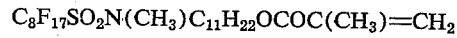
$$C_8F_{17}SO_2N(CH_3)C_{11}H_{22}OCOC(CH_3)=CH_2$$

7. A polymer according to claim 3 wherein the ester has the formula:

$$C_7F_{15}CH_2OCOC(CH_3)=CH_2$$

8. A polymer according to claim 3 wherein the ester has the formula:

$$C_7F_{15}C_3H_6OCOC(CH_3)=CH_2$$

9. A solution of a polymer according to claim 1 in an organic solvent, said solvent being free of groups capable of reacting with acyl halide radials.

10. A solution of a polymer according to claim 2 in an organic solvent, said solvent being free of groups capable of reacting with acyl halide radials.

11. A solution of a polymer according to claim 3 in an organic solvent, said solvent being free of groups capable of reacting with acyl halide radials.

12. A textile fabric which has been sized with a solution of an organic solvent containing a polymer according to claim 1 so as to have been rendered oil repellent, said solvent being free of groups capable of reacting with acycle halide radicals.

13. A textile fabric which has been sized with a solution of an organic solvent containing a polymer according to claim 2 so as to have been rendered oil repellent, said solvent being free of groups capable of reacting with acycle halide radicals.

14. A textile fabric which has been sized with a solution of an organic solvent containing a polymer according to claim 3 so as to have been rendered oil repellent, said solvent being free of groups capable of reacting with acycle halide radicals.

15. Fibers coated with a polymer according to claim 1 so as to have been rendered oil repellent.

16. Fibers coated with a polymer according to claim 2 so as to have been rendered oil repellent.

17. Fibers coated with a polymer according to claim 3 so as to have been rendered oil repellent.

References Cited

UNITED STATES PATENTS 3,102,103  8/1963  Ahlbrecht et al. ____ 260—89.5

FOREIGN PATENTS 857,689  1/1961  Great Britain.

OTHER REFERENCES

Schildknecht, Vinyl and Related Polymers, John Wiley and Sons, Inc., New York (1952), p. 298.

JOSEPH L. SCHOFER, *Primary Examiner.*

H. WONG, JR., *Assistant Examiner.*

UNITED STATES PATENT OFFICE
CERTIFICATE OF CORRECTION

Patent No. 3,330,812                                  July 11, 1967

Samuel Smith et al.

It is hereby certified that error appears in the above numbered patent requiring correction and that the said Letters Patent should read as corrected below.

Column 3, line 63, for "buten-(3-oyl chloride," read -- buten-(3)-oyl chloride, --; line 64, for "citroconyl chloride" read -- citraconyl chloride --; column 5, TABLE I, first column, line 1 thereof, for "chlorode" read -- chloride --; column 6, line 4, for "container" read -- contained --; line 19, for "methacrylyl" read -- acrylyl --; lines 19 and 20, for "1,1,1-trichloethane" read -- 1,1,1-trichloroethane --; line 30, for "ll" read -- II --; column 10, lines 63, 68 and 73, for "acycle", each occurrence, read -- acyl --.

Signed and sealed this 12th day of November 1968.

(SEAL)
Attest:

EDWARD M. FLETCHER, JR.                        EDWARD J. BRENNER
Attesting Officer                                Commissioner of Patents